US011836182B2

United States Patent
Westphal

(10) Patent No.: US 11,836,182 B2
(45) Date of Patent: Dec. 5, 2023

(54) SYSTEM AND METHOD FOR USING AN IMAGE TO OBTAIN SEARCH RESULTS

(71) Applicant: W.W. Grainger, Inc., Lake Forest, IL (US)

(72) Inventor: Geoffry A. Westphal, Evanston, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 14 days.

(21) Appl. No.: 17/330,671

(22) Filed: May 26, 2021

(65) Prior Publication Data

US 2021/0279273 A1 Sep. 9, 2021

Related U.S. Application Data

(63) Continuation of application No. 16/666,901, filed on Oct. 29, 2019, now Pat. No. 11,182,421, which is a continuation of application No. 15/480,802, filed on Apr. 6, 2017, now Pat. No. 10,698,946.

(51) Int. Cl.
*G06F 17/00* (2019.01)
*G06F 16/532* (2019.01)
*G06F 16/951* (2019.01)
*G06F 18/22* (2023.01)

(52) U.S. Cl.
CPC .......... *G06F 16/532* (2019.01); *G06F 16/951* (2019.01); *G06F 18/22* (2023.01)

(58) Field of Classification Search
CPC ...... G06F 16/532; G06F 16/951; G06F 18/22; G06K 9/6201
See application file for complete search history.

(56) References Cited

U.S. PATENT DOCUMENTS

| 5,267,332 | A | 11/1993 | Walch |
| 8,600,824 | B2 | 12/2013 | Sunkada |
| 9,280,560 | B1 * | 3/2016 | Dube ................ G06F 18/24147 |
| 9,406,031 | B2 | 8/2016 | Calman |
| 9,928,532 | B2 | 3/2018 | Torres |
| 10,437,878 | B2 * | 10/2019 | Ranzinger ............ G06K 9/6274 |
| 10,482,512 | B2 | 11/2019 | Meek |
| 10,698,946 | B2 | 6/2020 | Westphal |

(Continued)

*Primary Examiner* — Greta L Robinson
(74) *Attorney, Agent, or Firm* — GREENBERG TRAURIG, LLP; Gary Jarosik

(57) ABSTRACT

A system and method compares an image of an object of interest captured by an image capturing device from a first positional view relative to the object of interest against each of a plurality of images of each of a plurality of reference objects wherein each of the plurality of images of each of the plurality of reference objects is reflective of a unique positional view of the corresponding one of the plurality of reference objects to determine a second positional view relative to the object of interest at which the image capturing device is to be positioned to capture a further image of the product of interest. The further image of the product of interest is then compared against one or more of the plurality of images of one or more of the plurality of reference objects to identify at least one of the plurality of reference objects as being a match for the object of interest whereupon information about the one or more reference objects identified as being a match for the object of interest is provided to a user as a product search result.

12 Claims, 4 Drawing Sheets

(56) References Cited

U.S. PATENT DOCUMENTS

| | | | |
|---|---|---|---|
| 11,208,134 B2 * | 12/2021 | Carter | G06K 9/6267 |
| 2010/0094865 A1 | 4/2010 | Haswell et al. | |
| 2011/0270697 A1 | 11/2011 | Sunkada | |
| 2012/0232954 A1 | 9/2012 | Calman et al. | |
| 2013/0018881 A1 * | 1/2013 | Bhatt | G06T 11/60 |
| | | | 707/736 |
| 2014/0081926 A1 * | 3/2014 | Adams | G06F 16/51 |
| | | | 707/692 |
| 2015/0026156 A1 | 1/2015 | Meek et al. | |
| 2015/0254751 A1 | 9/2015 | Torres | |
| 2016/0232714 A1 | 8/2016 | McGuire et al. | |
| 2021/0216822 A1 * | 7/2021 | Paik | G06T 7/0012 |

* cited by examiner

SYSTEM AND METHOD FOR USING AN IMAGE TO OBTAIN SEARCH RESULTS

RELATED APPLICATION INFORMATION

This application claims the benefit of and is a continuation of U.S. application Ser. No. 16/666,901, filed on Oct. 29, 2019, which application claims the benefit of and is a continuation of U.S. application Ser. No. 15/480,802, filed on Apr. 6, 2017, the disclosures of which are incorporated herein by reference in its entirety.

BACKGROUND

Image recognition systems are generally known. By way of example, U.S. Pat. No. 5,267,332 describes a method and apparatus in which images are characterized and compared on the basis of internal structure, which is independent of image size and image orientation. A library of reference images is first generated and stored. Thereafter, each input image, or test image, is compared to the images stored in the library until a match is found. The image is represented in memory as nodes, lines, and curves. A plurality of descriptors, called reference keys and reference series, are generated for both the reference images and the test image. The reference library is screened for likely matches by comparing the descriptors for the test image to the descriptors in the reference images in the library. Inclusionary and exclusionary tests are performed. After screening, each candidate reference image is searched by comparing the pathway through the reference image and the pathway through the test image, and by the degree of correlation between the reference and test images. In addition, the link ratio, a measure of the portion of the test image actually matched to the reference image is computed.

SUMMARY OF THE INVENTION

The following generally describes a system and method for using an image of an object of interest to obtain search results from an image recognition system. More particularly, a system and method is described that functions to direct a user to one or more image capturing positions relative to the object of interest to thereby allow the user to obtain one or more images of the object of interest for submission to a search recognition system such that the search recognition system will provide improved search results.

While the forgoing provides a general explanation of the subject system and method, a better understanding of the objects, advantages, features, properties and relationships of the subject system and method will be obtained from the following detailed description and accompanying drawings which set forth illustrative embodiments and which are indicative of the various ways in which the principles of the subject system and method may be employed.

BRIEF DESCRIPTION OF THE DRAWINGS

For a better understanding of the subject invention, reference may be had to preferred embodiments shown in the attached drawings in which.

DETAILED DESCRIPTION

Figure 1:
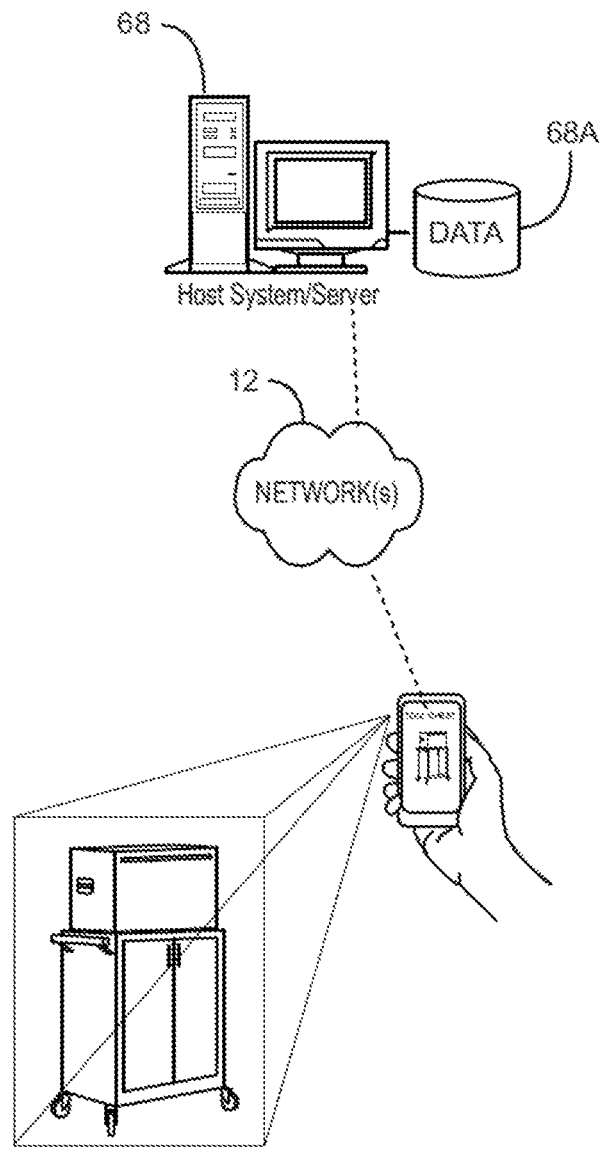
FIG. 1 is a block diagram illustrating components of an exemplary network system in which the subject method may be employed.

With reference to the figures, a system and method is hereinafter described that functions to direct a user to one or more image capturing positions relative to an object of interest to thereby allow the user to obtain one or more images of the object of interest for submission to a search recognition system such that the search recognition system will provide improved search results, i.e., more meaningful search results. While not intended to be limiting, the system and method will be described in the context of a plurality of processing devices linked via a network, such as a local area network or a wide area network, as illustrated in FIG. 1. In this regard, a mobile computing device 20, such as a tablet computing device, cellular phone, personal digital assistant, or the like, having a camera for use in capturing an image of an object of interest (e.g., a visual light-based image, an infrared-light based image, or the like) as well as conventional computing components as needed, is provided with executable instructions to, for example, provide a means for a user to access a remote processing device, i.e., a server system 68, via the network to, among other things, perform a search via use of an image recognition capable search engine supported by the remote processing device and to display search results obtained from the image recognition capable search engine. Generally, the computer executable instructions reside in program modules which may include routines, programs, objects, components, data structures, an "app," etc. that perform particular tasks or implement particular abstract data types. Furthermore, while described and illustrated in the context of a single mobile computing device 20, those skilled in the art will also appreciate that the various tasks described hereinafter may be practiced in a distributed or cloud-like environment having multiple processing devices linked via a local or wide-area network whereby the executable instructions may be associated with and/or executed by one or more of multiple processing devices.

As noted, the mobile computing device 20 preferably utilizes logical connections to one or more remote processing devices, such as the server system 68 having one or more associated data repositories 68A, e.g., storing a repository of reference images for use by the image recognition capable search engine, a database of product information, etc. In this regard, while the server system 68 has been illustrated in the exemplary form of a computer, it will be appreciated that the server system 68 may, like processing device 20, be any type of device having processing capabilities. Again, it will be appreciated that the server system 68 need not be implemented as a single device but may be implemented in a manner such that the tasks performed by the server system 68 are distributed to a plurality of processing devices linked through a communication network, e.g., implemented in the cloud. Additionally, the server system 68 may have logical connections to other third party server systems via the network 12 as needed and, via such connections, will be associated with data repositories that are associated with such other third party server systems.

To provide search results to a user, the server system 68 will have access to an image recognition capable search engine which will attempt to locate likely matches for an object image, e.g., an image uploaded to the server system 68. To this end, the image recognition capable search engine utilizes one or more known image recognition techniques, such as wavelet transformation techniques, intensity-based or feature-based techniques, orientation-invariant feature descriptor techniques, scale-invariant feature transformation techniques, etc. to determine if one or more reference images in a library of reference images, e.g., maintained in data repository 68A, matches or is similar to the object image. Because examples of devices adapted to perform image recognition through use of one or more of techniques may be found in US Published Application No. 2009/0161968, U.S. Pat. Nos. 7,639,881, and 5,267,332, among other references, the details of how such devices operate need not be explained in greater detail herein.

Figure 2:
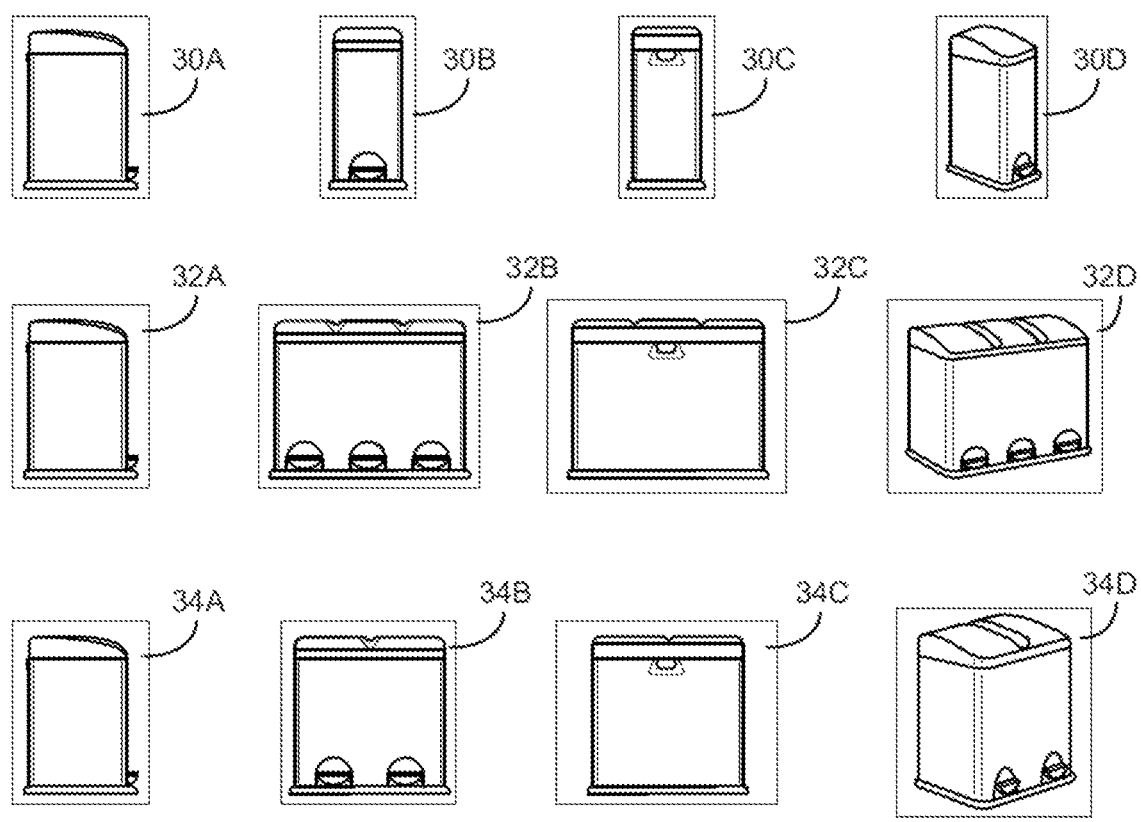
FIG. 2 illustrates an exemplary reference object image collection stored in a data repository of the system shown in FIG. 1.

To improve upon the likelihood that the image recognition capable search engine will be able to find a match for an object of interest (e.g., a product being sold by a vendor), the system and method described hereinafter will, as needed, function to direct a user to one or more image capturing positions relative to an object of interest to thereby allow the user to obtain one or more images of the object of interest for submission to the image recognition capable search engine. To this end, the data repository 68A is first preloaded with a plurality of reference images for each of a plurality of objects. For example, as illustrated in FIG. 2, the data repository 68A may store a first reference image 30A for a first object, a second reference image 30B for the first object, a third reference image 30C for the first object, a fourth reference image 30D for the first object, etc., a first reference image 32A for a second object, a second reference image 32B for the second object, a third reference image 32C for the second object, a fourth reference image 32D for the second object, etc, a first reference image 34A for a third object, a second reference image 34B for the third object, a third reference image 34C for the third object, a fourth reference image 34D for the third object, etc. Each reference image will be cross-referenced within the data repository to the corresponding object information and, in this manner, may be cross-referenced to additional information concerning that object, such as a product stock keeping unit number, pricing information, availability, product data sheets and the like as are commonly provided by e-commerce vendors.

Within the data repository, each reference image for a given object is further cross-referenced with orientation information that functions to define a location relative to the object from which the reference image was captured. By way of example, the orientation information that functions to define the location relative to the object from which the reference image was captured may be simple technical drawing data that describes the view shown in the reference images. Thus, in this instance, for the first object, the first reference image 30A may be cross referenced to data which indicates that the reference image 30A is a "left side elevation view" of the object, the second reference image 30B may be crossed referenced to data which indicates that the reference image 30B is a "front side elevation view" of the object, the third reference image 30C may be crossed referenced to data which indicates that the reference image 30C is a "rear side elevation view" of the object, the fourth reference image 30D may be crossed referenced to data which indicates that the reference image 30D is an "orthogonal view of the top, front, and left side" of the object, etc. By way of further example, the orientation information that functions to define the location relative to the object from which the reference image was captured may be three-dimensional Cartesian coordinate data that is indicative of an approximate point in space relative to a part of the object at which the image was captured. Thus, in the instance, for the first object, the first reference image 30A may be cross referenced to data which indicates that the reference image 30A was captured at approximately point X1, Y1, Z1 relative to the object, the second reference image 30B may be crossed referenced to data which indicates that the reference image 30B was captured at approximately point X2, Y2, Z2 relative to the object, the third reference image 30C may be crossed referenced to data which indicates that the reference image 30C was captured at approximately point X3, Y3, Z3 relative to the object, the fourth reference image 30D may be crossed referenced to data which indicates that the reference image 30D was captured at approximately point X4, Y4, Z4 relative to the object, etc. In any case, it will be appreciated that such data functions to define spatial relationships between the reference images for a given object.

Within the data repository, each reference image for a given object is further cross-referenced with data that is indicative of a measure of the visual complexity of that image. By way of example, the data can be a numerical value that is indicative of the number of edges shown in the reference image, the number of colors shown in the reference image, and/or the like. In this regard, it will be appreciated that distinctive features such as logos applied to products, trade dress applied to products, barcodes applied to products and the like will provide degrees of visual complexity that will assist the system in differentiating between possible matches of an object of interest and reference objects within the database. Since numerous different methods for assigning visual complexity values to images are known in the art, such methods will not be described herein for the sake of brevity.

Figure 3:
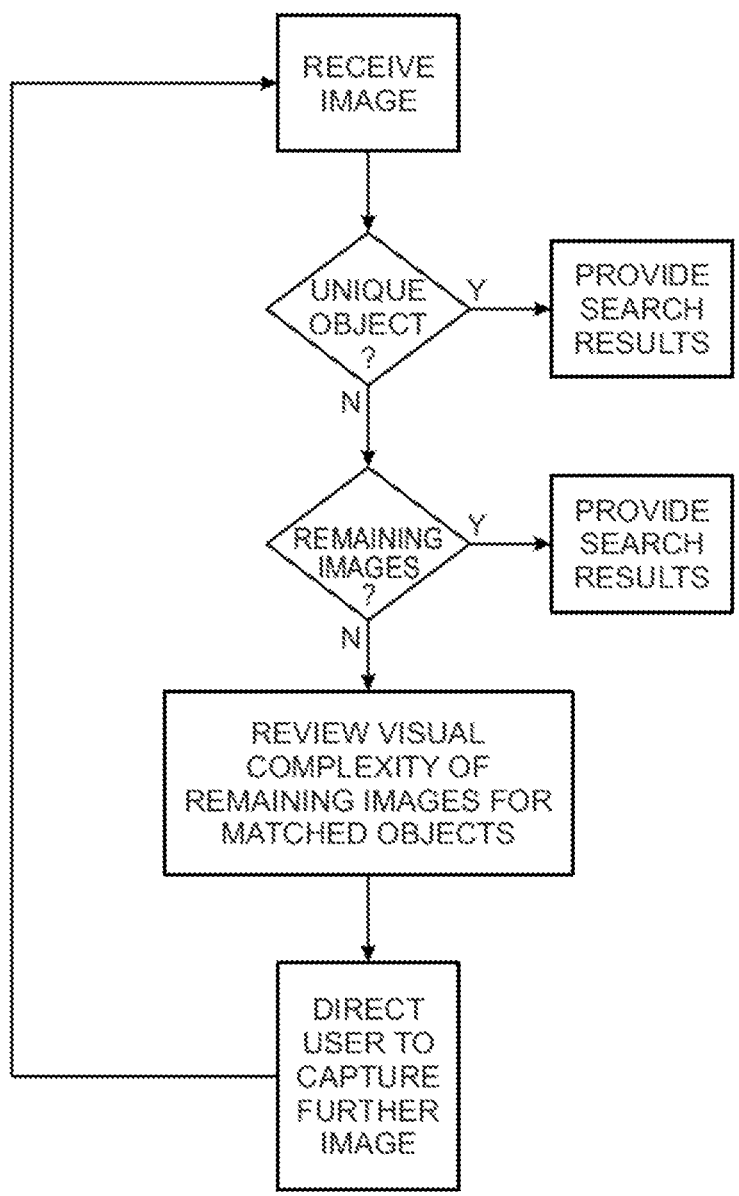
FIG. 3 illustrates an exemplary method for performing a image recognition search using the system shown in FIG. 1.

With the above information stored in the data repository 68A, the system and method functions to provide more meaningful search results by performing the steps generally shown in FIG. 3. More particularly, a user will first use the mobile computing device 20 to capture an image of an object of interest and will provide the captured image to server system 68 via use of the network 12. Upon receiving the image of the object of interest, the programming resident on the server system 68, particularly the image recognition capable search engine, will attempt to determine if the provided image of the reference object uniquely matches (or uniquely closely matches) any reference object images contained within the data repository 68A. If a unique match is found, the user may be returned information that has been associated with the matched object image, such as product cost, product availability, or the like as discussed above.

Figure 4:
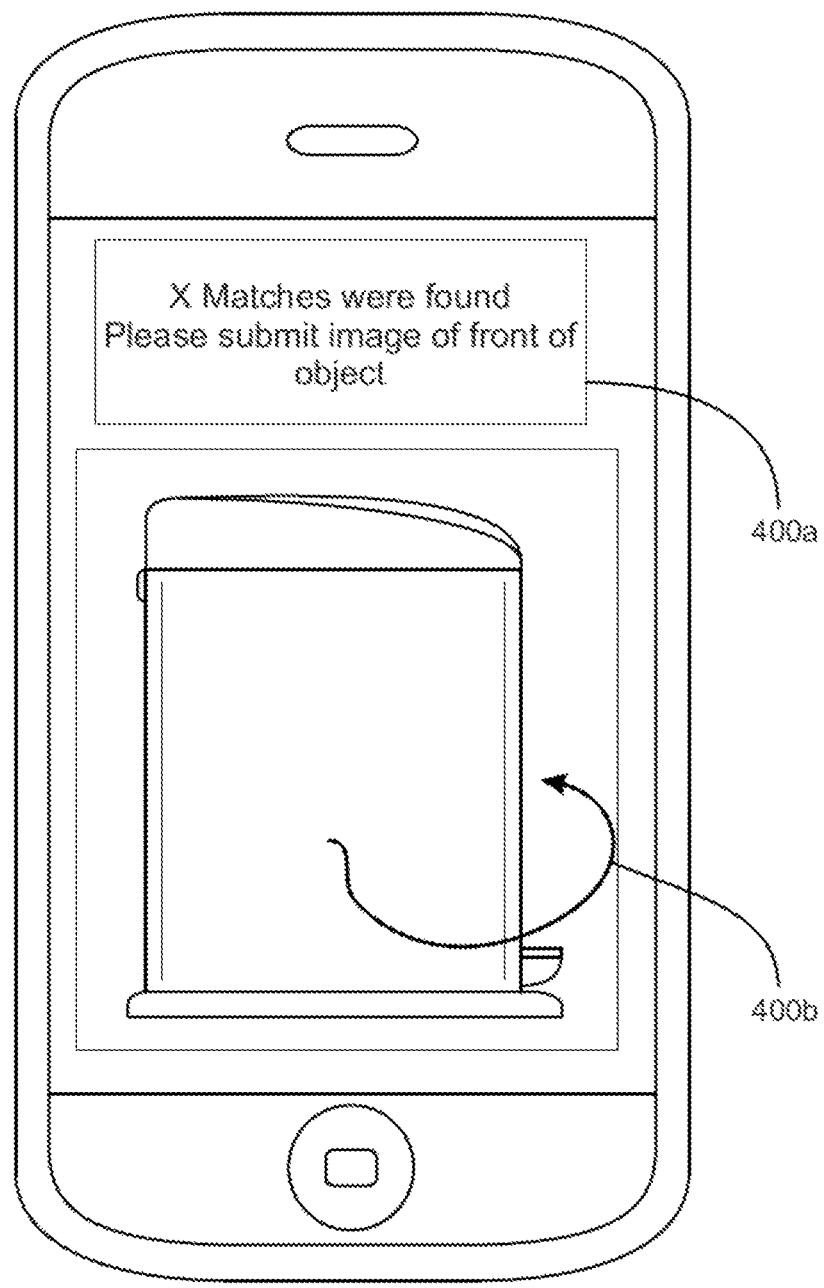
FIG. 4 illustrates an exemplary user interface for instructing a user how to move a portable device to capture a further image for submission to the image recognition system of FIG. 1.

In the case where the provided image of the object of interest does not uniquely match (or uniquely closely match) a reference object image within the data repository, for example, the user submits an image that the system determines is a match for reference object image 30A, 32A, and 34A shown in FIG. 2, the system will then evaluate the visual complexity of the related, remaining images, in this case each of images 30B, 30C, 30D, etc. that are related to matched reference image 30A, each of images 32B, 32C, 32D, etc. that are related to matched reference image 32A, and images 34B, 34C, 34D, etc. that are related to matched reference image 34A, to determine a further image view of the object of interest that should be submitted to the server system 68 for processing. By way of example, the system may determine that, for each similar view of a reference object, the "front elevation view" of the objects shown in each of reference images 30B, 32B, and 32C have the most diverse visual complexity associated therewith, e.g., the "front side elevation view" of the products shown in the reference images have distinctive trademarks, distinctive logos or nameplates, distinctive color combinations, distinctive edge and line characteristics, distinctive heat profiles, etc., and, as such, the user may be informed that a number of possible matches have been discerned for the "left side elevation view" provided while being instructed to move the camera to a location such that an equivalent "front side elevation view" of the object of interest may be captured for uploading to the server system 68 for processing by the image recognition capable search engine as generally shown in FIG. 4. In this case, because of the varied visual complexity in these like views of the objects shown in the reference object images, it is likely that one further image submission will allow the system to determine a match between a one of the reference objects and the object of interest. In a further example, the system may determine that a one of the reference object images related to the match reference object images has the highest visual complexity, e.g., off all the related reference object images, reference object image 32D has the highest visual complexity, and may likewise prompt the user to capture an image of the object of interest with a view that corresponds to the view in that reference object image.

In the event that a second (or third or further) submitted image of the object of interest does not result in a unique reference object image match, the server system 68 may again examine the visual complexity of the remaining reference object images to again suggest a further image for the user to capture and submit for processing. For example, if the user has submitted what is determined by the system to be a "left side elevation view" and a "front side elevation view" of the object of interest with no good match being the result, the visual complexity of the remaining views for the reference object images may be evaluated for further image taking directions in keeping with the above description. This process may continue until no further views are available for evaluation and/or until a maximum predetermined number of matches for the images submitted are found. In this instance, the user may be presented with search results that correspond to more than one product with the user then being provided with an opportunity to further filter, evaluate, or the like such information in keeping with conventional e-commerce practices.

In instances where the orientation information maintained within the data repository 68A is defined using Cartesian coordinates, the system may use location determining functionality resident on the mobile computing device 20, e.g., accelerometers and associated programming, to guide the user to an approximate location at which the next image of the object of interest should be captured. For example, in the example where a user submits an image of an object of interest which the system determines is a match for reference object images 30A, 32A, and 34A, which means that the image capturing device of the portable computing device 20 was positioned generally at location X1, Y1, Z1 relative to the object of interest when the image was captured, the system may use the location determining functionality of the portable computing device 20 to graphically instruct the user, using arrows, text, or the like indicium 400a/400b displayed on the display screen as shown in FIG. 4 (which may be overlayed upon an image of the object of interest that is currently being captured by the camera), sounds, or other queues, such that the image capturing device of the portable computing device 20 is moved from about location X1, Y1, Z1 relative to the object of interest to about location X2, Y2, Z2 relative to the object of interest, e.g., the orientation information associated with the views that were determined to have the greatest visual complexity differences or the like, in keeping the methodology described above. It is also contemplated that the mobile computing device can be caused to automatically capture the image for submission to the system once it is determined that the mobile computing device has been moved to the desired location relative to the object of interest.

From the foregoing, it will be appreciated that the described system and method functions to improve the operability of a computer system. For example, by directing a user to capture one or more specific images of an object of interest, the system and method reduces the submission by users of images that are not likely to lead to meaningful search results. This, in turn, reduces the need for the system to perform "useless" image recognition on such images which ultimately functions to free-up the system whereby more "meaningful" search requests received from users may be processed. In addition, by directing the user to submit images that are more likely to result in meaningful search results, data traffic on the network can be reduced to the benefit of the user (particularly where the user has a limited cellular data plan) and the system operator. Still further, time will be saved on the part of the user as the user's mobile device will not have to spend as much time uploading images to the network.

While various concepts have been described in detail, it will be appreciated by those skilled in the art that various modifications and alternatives to those concepts could be developed in light of the overall teachings of the disclosure. In this regard, while described in the context of finding a match for a product of interest, it will be appreciated that the functionality described herein could be used to instruct a user to move a camera to capture images of an environment for use in further refining search results. For example, directional arrows can request the user to move down a hallway, or to pan left, right, up at the ceiling, or down at the floor. In this way, a better understanding is established of what type of environment the user is in. It could be a boiler room, a foyer with elevator shafts, a garage, etc. This type of image recognition allows for better search results when an object is searched for in that environment, e.g., when a complete image set is collected from inside a restroom, it can be discerned that the restroom has low-flow toilets and this type of information might establish the building to be a LEED building such that, when visual searching for sink faucets, the extra piece of information that the building is LEED can help narrow search results to only auto-shutoff faucets.

Still further, it will be appreciated that the system described herein may also be caused to issue an instruction to increase or decrease a zoom level of the camera when taking the next image for submission to the system, to issue an instruction to use a flash when taking the next image for submission to the system, to place an object next to the object of interest for scaling purposes when taking the next image for submission to the system, to use a strobe light when taking the next image for submission to the system (particularly when it is determined that the object of interest has one or more moving components), etc. without limitation. As discussed herein, such instructions may be used to cause the camera to automatically take the picture(s) desired.

Yet further, while various aspects of this invention have been described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation.

It will be additionally appreciated that the particular concepts disclosed are meant to be illustrative only and not limiting as to the scope of the invention which is to be given the full breadth of the appended claims and any equivalents thereof.

What is claimed is:

1. A tangible, non-transitory, computer-readable medium storing computer program instructions that when executed by one or more processors effectuate operations comprising:
    obtaining, with a computer system, a first plurality of images of a first object;
    obtaining, with the computer system, a second plurality of image of a second object;
    associating with each of the first plurality of images a first orientation information that functions to define a location relative to the first object from which each of the first plurality of images was captured and a first visual complexity value; and
    associating with each of the second plurality of images a second orientation information that functions to define a location relative to the second object from which each of the second plurality of images was captured and a second visual complexity value;
    receiving, with the computer system, a query image as captured by an imaging device; and
    using the first orientation information and the first visual complexity value, the second orientation information and the second complexity value, and a third orientation information that functions to define a location relative to a query object from which the query image was captured by the imaging device and a third visual complexity value of the query object in a querying operation performed by the computer system to determine whether the query object corresponds to the first object, the query object corresponds to the second object, or if additional information is required from a user to assist in making an object recognition determination whereupon device instructions are caused to be sent to the image capturing device to cause the image capturing device to present an indicium to assist a user in moving the image capturing device relative to the query object for the purpose of capturing a second query image of the query object for submission to the computer system.

2. The tangible, non-transitory, computer-readable medium as recited in claim 1, wherein the first orientation information that functions to define the location relative to the first object from which each of the first plurality of images was captured comprises technical drawing orientation data.

3. The tangible, non-transitory, computer-readable medium as recited in claim 1, wherein the first orientation information that functions to define the location relative to the first object from which each of the first plurality of images was captured comprises three-dimensional coordinate data.

4. The tangible, non-transitory, computer-readable medium as recited in claim 1, wherein the second orientation information that functions to define the location relative to the second object from which each of the second plurality of images was captured comprises technical drawing orientation data.

5. The tangible, non-transitory, computer-readable medium as recited in claim 1, wherein the second orientation information that functions to define the location relative to the second object from which each of the second plurality of images was captured comprises three-dimensional coordinate data.

6. The tangible, non-transitory, computer-readable medium as recited in claim 1, wherein the indicium comprises an image displayed in a display of the image capturing device.

7. The tangible, non-transitory, computer-readable medium as recited in claim 1, wherein the indicium comprises a sound caused to be emitted from the image capturing device.

8. The tangible, non-transitory, computer-readable medium as recited in claim 1, wherein the device instructions cause the image capturing device to use a movement sensing device associated with the image capturing device to assist the user in moving the image capturing device according to the indicium.

9. The tangible, non-transitory, computer-readable medium as recited in claim 8, wherein the device instructions cause the image capturing device to automatically capture the second query image.

10. The tangible, non-transitory, computer-readable medium as recited in claim 1, wherein the image capturing device comprises a camera for capturing visible-light imagery.

11. The tangible, non-transitory, computer-readable medium as recited in claim 1, wherein the image capturing device comprises a camera for capturing non-visible-light imagery.

12. The tangible, non-transitory, computer-readable medium as recited in claim 11, wherein the image capturing device comprises a camera for capturing infrared light imagery.

* * * * *